Nov. 19, 1935.   T. E. KING   2,021,149
HOT WATER HEATING SYSTEM
Filed Nov. 25, 1932   2 Sheets-Sheet 1
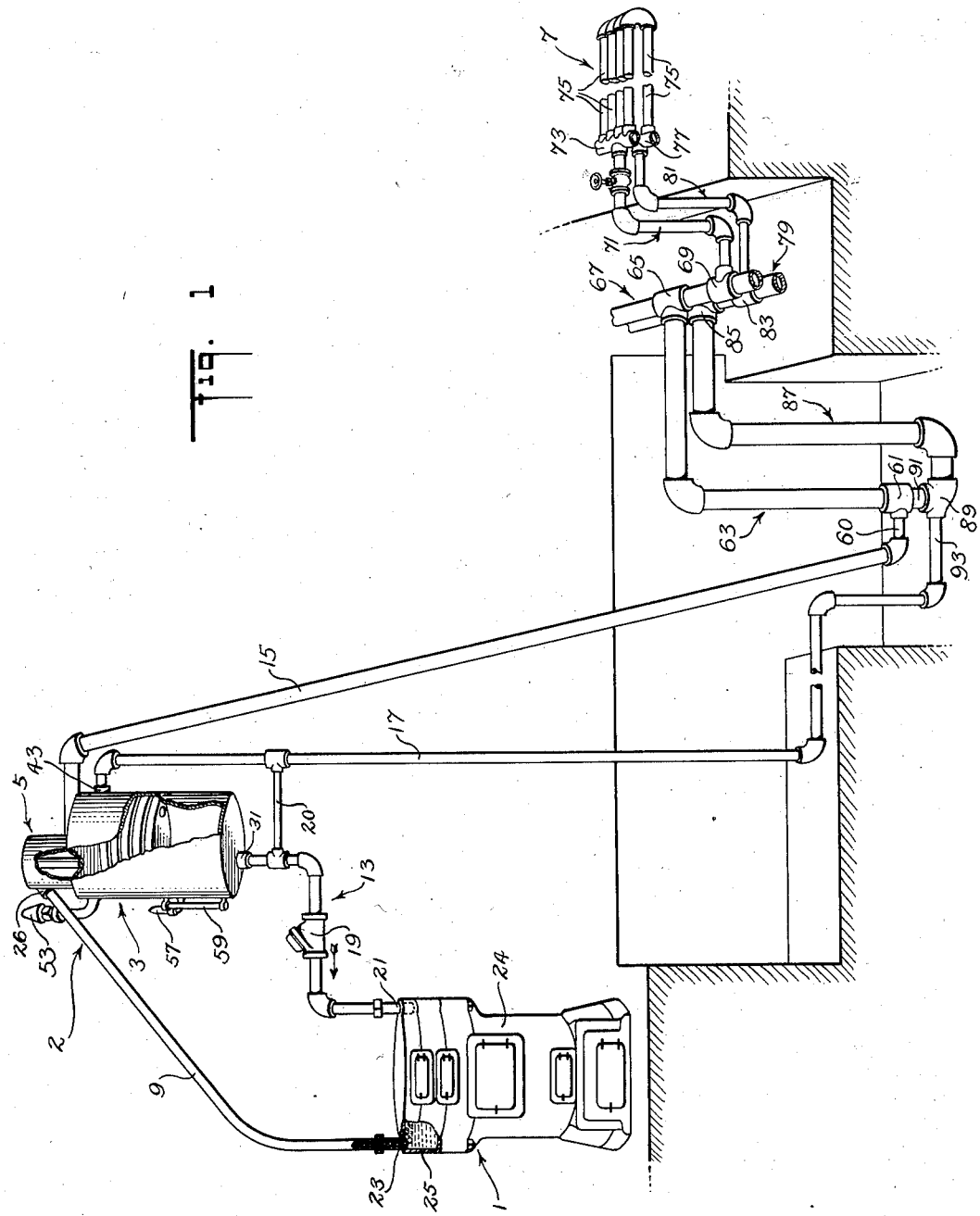
INVENTOR
Thomas E. King
BY
Janney Blair & Curtis
ATTORNEYS Nov. 19, 1935.  T. E. KING  2,021,149
HOT WATER HEATING SYSTEM
Filed Nov. 25, 1932   2 Sheets-Sheet 2
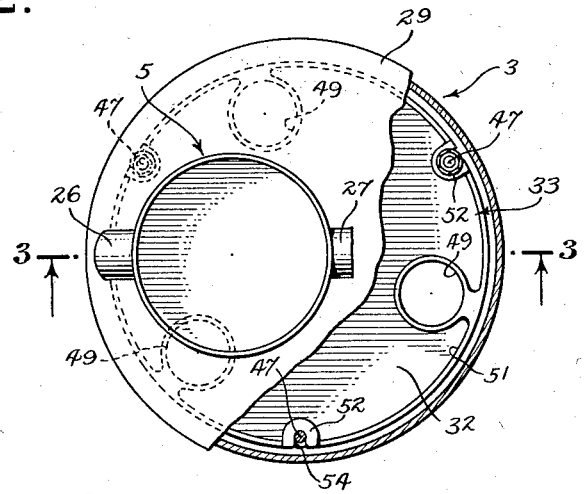
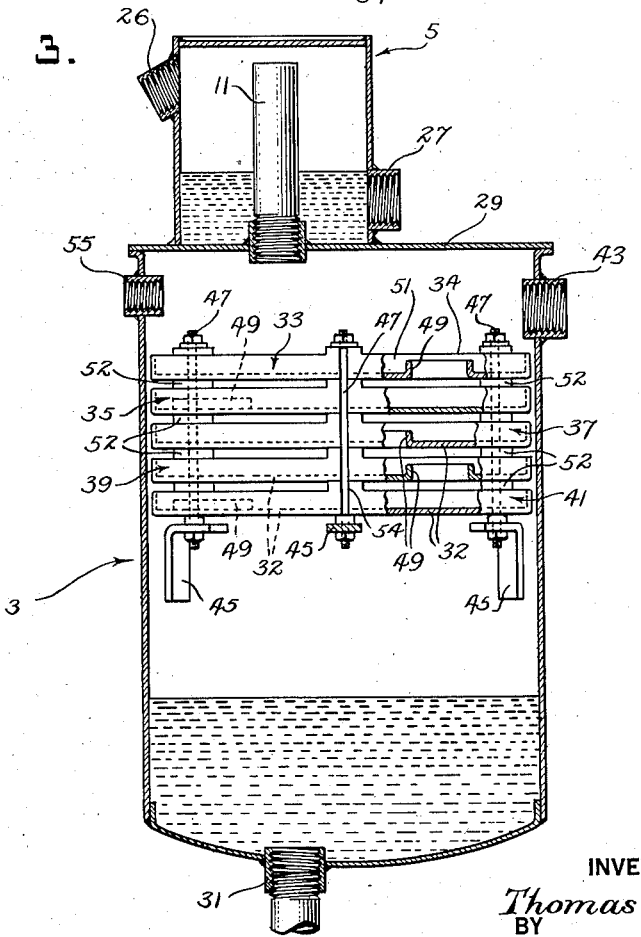
INVENTOR
Thomas E. King
BY
Janney Blair & Curtis
ATTORNEYS Patented Nov. 19, 1935

2,021,149

UNITED STATES PATENT OFFICE 2,021,149

HOT WATER HEATING SYSTEM

Thomas E. King, Westfield, N. J., assignor to Hitchings & Company, Elizabeth, N. J., a corporation of New Jersey Application November 25, 1932, Serial No. 644,179

2 Claims. (Cl. 237—60)

This invention relates to heating systems, and more particularly to a type of heating system employing a fluid as a heat exchange medium.

One of the various objects of the invention is to provide a heating system whose primary characteristics are simplicity, practicability and fool proof operation.

Another object is to provide a system of the above character in which the flow of the heat exchange medium is positive and reliable. Another object is to provide a heating system of the above character which is readily susceptible to an accurate temperature control and which is more economical to operate. Another object is to provide apparatus for a heating system of the above character, whose manufacture is very inexpensive and may be accomplished with a minimum amount of labor. Another object is to provide an efficient and reliable system for heating domestic, agricultural or industrial establishments.

Other objects will be in part obvious and in part pointed out hereinafter.

The invention accordingly consists in the features of construction, combinations of elements, and arrangements of parts as will be illustratively described herein, and the scope of the application of which will be indicated in the following claims.

In the accompanying drawings, in which are shown one or more of the various possible embodiments of this invention, Figure 1 is a diagrammatic view of a heating system constructed in accordance with the present invention;

Figure 2 is a top plan view of the separator and tank shown in Figure 1, certain parts thereof being broken away; and, Figure 3 is an enlarged vertical section taken on line 3—3 of Figure 2.

Corresponding reference characters indicate corresponding parts throughout the several views of the drawings.

As conducive to a clearer understanding of certain features of the invention, it is pointed out that heating systems employing a liquid heat exchange medium as water, have a distinct disadvantage in that it is often necessary to heat large amounts of water to a relatively high temperature in order to obtain the desired circulation of the heat exchange medium, which circulation may become decidedly sluggish as the temperature difference of the water drops. In the operation of such heating systems it is generally required, whenever a rapid heating of a room is desired, to heat a greater part of the water in the system to a relatively high temperature in order to obtain the desired circulation and desired heating. This operation is undesirable because after the room has been heated to the desired temperature and the heat being supplied to the water has been shut off, the water continues to circulate and is capable of giving off a relatively large amount of heat whereby the room may be heated to a temperature far above that desired.

Further, hot water heating systems have the disadvantage of becoming air locked, whereby the circulation through the heating system is appreciably cut down, and hence the efficiency markedly lowered. These hot water systems also have another disadvantage in that, under certain conditions, the flow of the heated heat exchange medium is not positive, or does not move in one direction.

One of the dominant aims of this invention is to eliminate in a thoroughly practical, dependable, efficient way such difficulties as those above mentioned, as well as many others.

In order that the operation of the heating system may be more clearly understood as the individual parts are described, the following brief description of the flow through the system is given. In the system shown in Figure 1, a mixture of steam and water is delivered from a heater 1 to a separator or percolator 5, which separates the steam and water, and which delivers the separated water to a heat exchange apparatus 7. The separated steam flows to a reservoir 3 where it condenses with spent water returning from the heat exchange apparatus, and from the reservoir the water returns to the heater 1. The heater 1, the separator 5 and the tank 3 comprise what will be hereinafter referred to as the heating apparatus and which is generally indicated at 2.

Referring now more particularly to Figure 1, there is shown a hot water heater, generally indicated at 1, provided with a fire box 24 above which is located a boiler 25 arranged to be heated by the fire in the fire box 24 and having an inlet 21 extending below the surface of the water in the boiler and preferably three or four inches below the top of the boiler 25, and an outlet 23 preferably leading from the top. With this arrangement water may enter near the top of the boiler 25 through the inlet 21 and leave at the top of the boiler through the outlet 23, the entrance of the water near the top insuring a thorough intermingling of the cooler and hotter water in boiler 25 whereby more efficient operation of the system is provided. Connected with the outlet 23 is a pipe 9 which is also threaded into an inlet 26, at the top of a separator 5 (see Figure 3).

The separator 5 may be located appreciably above the heater 1 and preferably comprises a relatively small tank having a threaded outlet 27 near the bottom thereof, and a steam outlet 11 near the top thereof. Outlets 27 and 11, as well as inlet 26, are located in such a way that none of the water of the mixture of steam and water entering from the pipe 9 (Figure 1) and inlet 26 passes through the steam outlet 11. The pipe 11, is secured to and passes through a bottom 29 of the separator 5 and the top of the pipe 11, extends to a point near the top of the separator, and is preferably displaced from the vicinity of the inlet 26. The vertical distance separating the top of the outlet 11 from the outlet 27 is governed by the capacity of the heating system, and should be sufficient to provide for the proper separation of the steam and water mixture entering from the heater when the heater is operating at maximum capacity.

The stream outlet 11 is preferably connected with the top of the tank or reservoir 3. In the present embodiment, the separator 5 is located on top of the tank 3, a cover 29 of the tank 3 preferably forming the bottom of the separator 5. This arrangement is advantageous in that the construction of the separator 5 and the tank 3 is appreciably simplified and the manufacturing expense reduced.

The tank 3 is made sufficiently large to act as a reservoir for surplus water in the heating system, and supplies the water removed from the heater 1 through an outlet 31 connected to the heater 1 (Figure 1) by a conduit generally indicated at 13 in turn connected to inlet 21.

I further increase the efficiency of my improved heating system by making the tank 3 sufficiently large to accommodate a steam condensing apparatus, which preferably comprises a series of trays 33, 35, 37, 39 and 41 (Figures 2 and 3) vertically spaced from one another by means of lugs 52 or other spacing means preferably formed on the top of each tray and at the margins thereof.

Various methods of mounting the trays within the tank may be used, but I prefer to use a series of brackets 45 welded or otherwise suitably attached to the sides of the tank. Indentations 54 (Figure 2) are formed in the outer peripheries of the respective trays, and when properly aligned, serves to accommodate bolts 47 which are secured to the brackets 45. Accordingly, when the trays are arranged one above another, with the respective indentations 54 as well as lugs 52 aligned, the bolts serve to clamp the trays together and to rigidly secure them to the brackets 45 and thus to the sides of the tank 3.

Each of the trays has a floor portion 32, a side wall portion 51, and an over-flow 49, the top of the over-flow 49 extending to a position slightly beneath the level of the top 34 of the side wall 51. The trays are arranged in the tank in such a manner that the over-flows 49 are staggered; no one over-flow being directly beneath another. With this arrangement, fluid entering at the top of the tank 3 encounters first the tray 33, and thence it flows through the over-flow 49 to the next tray 35 and thence in the same manner to the next tray 37 and so on until it flows out of the tray 41 into the bottom of the reservoir 3.

From the foregoing it will be seen that steam, from the mixture of steam and water entering the separator 5 from the heater 1 flows through the steam outlet 11 and enters the top of the tank 3, at a point above the top tray 33.

The tank 3 has an inlet 43 connecting with a return pipe 17, leading to the heat exchange apparatus 7. This inlet 43 is located just above the top tray 33 so that the spent water entering from the heat exchange apparatus 7, as will be described more fully hereinafter, flows on to the top tray 33 where it first comes in contact with the steam entering from the steam inlet 11. The two fluids, after contact on the top plate 33, then pass through the over-flow 49 to the next plate and so on until the plate 41 is reached whence the water (substantially all the steam being condensed at this stage) passes to the bottom of the tank 3 which acts as a reservoir. This intermingling of the steam from the separator 5 with the water from the heat exchange apparatus 7 performs the dual function of condensing the steam and heating the water prior to its return to the heater 1, and accordingly increases the efficiency of the system.

The inlet 43 in addition to being placed just above the top tray 33 is preferably located at a point lower than the outlet 27 in the separator 5, the difference in the vertical distance between the two providing for a hydrostatic head to be hereinafter described.

In addition to the above provisions, the tank 3 has a suitable safety valve 53 of any convenient construction connected with the top of the tank by way of a threaded inlet 55 (Figure 3). An air valve 57 is also provided (see Figure 1) and is preferably located just beneath the last tray 41 but above the normal water level where there is generally a minimum amount of steam present. A water level gage, such as is shown at 59 (see Figure 1), may also be provided in the tank 3.

In order to insure a more positive downward flow of the water from the reservoir 3 to the heater 1 through the conduit 13, and to guard against any flow from the heater 1 to the reservoir 3 through the conduit 13, I provide a check valve 19 in the conduit 13. The check valve may be of the ball type, permitting flow of liquid through the pipe in the direction indicated by the arrow, and preventing flow in a reverse direction.

It will now become clear that under what I will refer to as normal conditions, the water level in the reservoir 3 is also maintained at substantially the same height in the pipe 9, a continuous connection between the two levels being maintained through the conduit 13, the inlet 21, the boiler 25, the outlet 23 and the pipe 9. Now, as the water in the boiler of the heater 1 reaches a temperature approaching its boiling point, a portion of it is converted into steam which, as shown in Figure 1, rises in the pipe 9, whereby the pipe becomes filled with a mixture of steam and water. But, the mixture thus filling the pipe 9 has a relatively low density as compared with water, and the head of water in the reservoir 3 acting through the conduit 13, the inlet 21 and the boiler 25 forces the steam and water mixture into the separator 5. With this operation, water flows into the heater 1 from the reservoir 3 equal in amount to the water and steam delivered to the separator 5 from the heater 1. The incoming water lowers the temperature of the water in the heater to a point below its boiling point, and for a certain length of time the so-called normal conditions are again maintained in the heating apparatus. However, the heat being continuously supplied to the boiler 25 again heats the water to its boiling point whereby steam again rises in the pipe 9 to form a steam and water mixture therein which is delivered to the separator 5 as hereinabove described. In this manner the steam and water mixture is delivered to the separator 5 at intervals determined in part by the rate of firing and in part by the amount of heat spent from the coils 7, but, the time between the deliveries or surges being controllable generally by the amount of heat supplied to the boiler.

Under certain conditions of operation of my heating system, I have found that sudden pressures which may occur in the boiler 25 as the water is changed into its vapor phase may cause a surging of the water in the boiler 25 back into the inlet 13 and the conduit 13 into the tank or reservoir 3. However, as above described, I have overcome this difficulty which sometimes occurred, by providing the check valve 19 in the line 13. In addition to preventing any pressure in the boiler 25 from causing a flow of water from the heater 1 to the reservoir 3, the check valve has the further advantage in that it makes it possible to utilize any pressure developed in the boiler 25 to force the steam and water mixture in the pipe 9 into the separator 5, this action being accomplished by preventing any escape of the water or steam through the inlet 21. In this way any steam pressure in the boiler 25 aids the hydrostatic head of water in the reservoir 3 in forcing the steam and water mixture into the separator 5, and accordingly the capacity and efficiency of the heating system is increased.

The mixture of steam and water, which for purposes of description may be assumed to be at a temperature of 210°, now enters the separator 5 where the water falls to the bottom thereof and flows from the outlet 27 to the heat exchange apparatus 7 through a pipe 15 connected with outlet 27 as shown in Figure 1. The steam, thus separated from the water, flows through the top of the steam outlet 11 into the top of the tank 3 where it mixes with the spent or cooled water returning from the coils 7 through a pipe 17 and is condensed on trays 33, 35, 37, 39 and 41 as described above; in this way the latent heat of the steam which is given up in condensing pre-heats the spent water which is to return to the heater by way of conduit 13, thus maintaining this water at a maximum temperature.

Referring now to the heat exchange apparatus, the coils 7 are connected with the heating apparatus 2 through the feed pipe 15 and return conduit 17. The feed pipe 15, which is connected to the bottom of the separator by way of outlet 27, has a relatively large diameter as compared with the return conduit 17 and preferably is given an appreciable slant as is shown in Figure 1.

I have found that under certain peculiar conditions of operation air collects in the feed pipe 15 connecting the separator 5 with the heat exchange apparatus 7, and that water entering the pipe 15 from the separator 5 is prevented from passing therethrough by the air which was not able to escape past the water. When such a condition arises, the heating system becomes air-locked and does not function properly. However, with the unique arrangement of the feed pipe 15, as above described, if any air is present in the pipe 15 when water enters it from the separator 5, the relatively large diameter of the pipe together with the slant enables the air to escape readily to the top of the pipe 15 into the separator 5 whence it can flow through the steam outlet 11 into the reservoir 3 and out through the air valve 57.

In this way I substantially safe-guard the system against becoming air-locked, and accordingly provide for a more dependable and uniform flow of water from the separator 5 to the heat exchange apparatus 7.

The pipe 15 is connected with the heat exchange apparatus 7 through a relatively small coupling 60, a larger coupling 61, a vertical line generally indicated at 63, a coupling 65 and main feed or distributing conduit 67. The feed or distributing line 67 is provided with couplings such as 69 for connecting pipe lines such as 71 with the feed lines 67, each pipe line 71 connecting a feed header 73 and coils 75 of the heat exchange apparatus 7.

The coils 75 are also connected with a return header 77 which is connected with a return distributing line 79 similar to the feed distributing line 67 through a line 81 and a coupling 83. The return distributing line 79 is connected through a coupling 85 with a vertical return line 87 which in turn is connected through couplings 89 and 91 to the coupling 61. The coupling 89 is also connected with the return conduit or line 17 through a pipe 93.

The flow of water through the circuit formed by the pipe 15, coupling 60, coupling 61, line 63, coupling 65, line 67, coupling 69, line 71, to the heat exchange apparatus 75, and back to conduit 17 through line 81, coupling 83, line 79, coupling 85, line 87, and couplings 89 and 93, primarily results from a hydrostatic pressure created by positioning the water supply to the pipe 15 appreciably above the inlet 43 of the return conduit 17. In other words, the water in the separator 5 acts as a hydrostatic head to force water from pipe 15 up through the heat exchange apparatus and the conduit 17 into the reservoir 3 and hence the rate of flow through this circuit is primarily governed by the hydrostatic pressure. Under certain conditions of operation it may be desirable to have a rapid flow through the circuit in which event the outlet 27 of separator 5 is positioned relatively high above the inlet 43 in the tank 3. However, under other conditions, when it is desirable to reduce the rate of flow, the separator 5 and the tank 3 are designed in such a way that the outlet 27 is not positioned as far above the inlet 43.

From the description of the circuit above described it is clear that the temperature of the water in the pipe line 63 is above that in the line 87 and hence by providing a connection between the two lines 63 and 87 through the coupling 91, I provide for a thermosiphon circulation which may be traced as follows: Hot water enters the line 63 from the coupling 60 and intermingles with water flowing by reason of the thermosiphon action from the line 87. This mixture of water then flows to the heat exchange apparatus 7 through lines 63, 67 and 71, where it is cooled in the coils 75. The cooler water being heavier than the water rising in the line just described, flows down through lines 81, 79 and 87 to the coupling 89 where part rises through coupling 91 and is mixed with the warmer water entering from the feed pipe 15, the remainder returning through the coupling 91 and the return feed line 17 to the reservoir 3. The amount returning to the reservoir is equal to the amount entering the heat exchange apparatus from the separator 5.

From the above it is clear that the flow through the lines 63, the heat exchange apparatus 7 and the line 87, results from the hydrostatic head existing because of the vertical separation of the outlet 27 and the inlet 43, in the separator 5 and reservoir 3 respectively, as well as from the thermo-siphon action just described. It is further clear that for this reason the volume of flow through the heat exchange apparatus 7 is maintained at a maximum.

With the apparatus and system which I have described, I am able to obtain a very accurate control of the heating effect of the coils 7. This is possible for many reasons, among which are:

The temperature of the water supplied to the heat exchange apparatus by the pipe 15 is always constant and is at a substantially maximum liquid phase temperature.

The rate of flow through the coils 7 may be accurately controlled and hence the number of the coils heated to the maximum temperature may be controlled and in this way the effective heating area is governed. I am able to vary the circulation with precision because there is no circulation in the heating apparatus until a delivery of steam and water is made to the separator 5, and by a simple regulation of the amount of heat supplied to the boiler I am able to control the deliveries to the separator 5. For example, one delivery per minute may be sufficient to heat one turn of the coils; two deliveries per minute may be sufficient to heat two turns of the coils, and so forth; but whenever I stop the heating of the water in the boiler 25, the circulation through the pipe 15 and the conduit 17 is stopped as well as an appreciable amount of the circulation through the coils 7 whereby only that heated water remaining in the coils 7 is capable of continuing to give off heat to the room being heated.

To improve further the operation of my improved heating system, I provide, between the return line 17 and the conduit 13, a relatively small pipe connection 20, which connects with the conduit 13 between the reservoir and the check valve. The pipe 20 is preferably of such a capacity that during a normal flow of the heat exchange medium through the heating system, there is substantially no flow of the water directly from the line 17 to the conduit 13 through the connection 20. But, if, when the system is idle and there is substantially no flow of water through the line 17, the heat exchange apparatus for some reason or other loses some or all of its water, the loss is made up by a flow from the reservoir 3 through the conduit 13 through the connection 20 and to the line 17. Thus, if there is water in the reservoir 3, as indicated by the gage 59, I am assured, because of the connection 20, that there is water in the rest of the system.

It will thus be seen that there has been provided in this invention a heating system and apparatus therefor in which the various objects hereinabove set forth, as well as many others, together with the highly practical advantages, are successfully attained, and the many disadvantages and difficulties of the prior practices successfully eliminated.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

What is claimed is:

1. In an apparatus of the character described, a boiler, a percolator above said boiler, a connection from said boiler to said percolator, a reservoir above said boiler and below said percolator, said percolator comprising means for separating steam from water and having a steam outlet and a water outlet, a conduit connecting said steam outlet of said percolator to said reservoir, a steam condenser in said reservoir, a heat exchange apparatus, a hot water feed line connecting said water outlet of the percolator to said heat exchange apparatus, a return feed line from said heat exchange apparatus to the upper part of said reservoir, a connection between the lower part of said reservoir and the boiler, means for indicating the water level in said reservoir, and a pipe of small flow capacity between said return feed line and the second-mentioned connection.

2. In an apparatus of the class described, a boiler, a percolator above said boiler, a connection from said boiler to said percolator, a reservoir above said boiler and below said percolator, said percolator comprising means for separating steam from water and having a steam outlet and a water outlet, means for condensing the steam from said steam outlet of said percolator and delivering to said reservoir, a heat exchange apparatus, a hot water feed line connecting said water outlet of the percolator to said heat exchange apparatus, a return feed line from said heat exchange apparatus to said condensing means, a connection between the lower part of said reservoir and the boiler, means for indicating the water level in said reservoir, and a pipe of small flow capacity between said return feed line and the second-mentioned connection.

THOMAS E. KING.